United States Patent
McCann et al.

(10) Patent No.: US 8,626,410 B2
(45) Date of Patent: Jan. 7, 2014

(54) POWERTRAIN SYSTEM HAVING LOCKABLE DIFFERENTIAL

(75) Inventors: Gerry O. McCann, Dunlap, IL (US); Brian A. Byers, Decatur, IL (US); Fazal A. Goraya, Peoria, IL (US); David R. Wisley, Peoria, IL (US); Kevin B. Grover, Elmwood, IL (US)

(73) Assignee: Caterpillar Inc., Peoria, IL (US)

( * ) Notice: Subject to any disclaimer, the term of this patent is extended or adjusted under 35 U.S.C. 154(b) by 11 days.

(21) Appl. No.: 13/355,977

(22) Filed: Jan. 23, 2012

(65) Prior Publication Data

US 2013/0190995 A1 Jul. 25, 2013

(51) Int. Cl.
*G06F 17/00* (2006.01)

(52) U.S. Cl.
USPC ............................. 701/52; 477/35

(58) Field of Classification Search
USPC .................... 701/51–53; 477/34, 35
See application file for complete search history.

(56) References Cited

U.S. PATENT DOCUMENTS

| | | | |
|---|---|---|---|
| 3,871,249 A | 3/1975 | Jeffers | |
| 4,010,830 A | 3/1977 | Logus et al. | |
| 4,070,904 A * | 1/1978 | VanderLans | 73/40.5 R |
| 4,263,824 A * | 4/1981 | Mueller | 475/86 |
| 4,358,000 A | 11/1982 | Cumming | |
| 4,396,100 A | 8/1983 | Eltze | |
| 4,655,326 A | 4/1987 | Osenbaugh | |
| 4,715,012 A * | 12/1987 | Mueller, Jr. | 701/50 |
| 5,050,710 A | 9/1991 | Bargfrede | |
| 5,495,927 A | 3/1996 | Samie et al. | |
| 5,505,267 A | 4/1996 | Orbach et al. | |
| 5,540,305 A | 7/1996 | Hammond et al. | |
| 5,802,489 A | 9/1998 | Orbach et al. | |
| 6,038,506 A | 3/2000 | Diekhaus et al. | |
| 6,062,367 A | 5/2000 | Hirayanagi et al. | |
| 6,174,255 B1 | 1/2001 | Porter et al. | |
| 6,186,285 B1 | 2/2001 | Parsons | |
| 6,237,727 B1 | 5/2001 | Tatewaki et al. | |

(Continued)

FOREIGN PATENT DOCUMENTS

| | | |
|---|---|---|
| JP | 2011021405 | 2/2011 |
| KR | 10-0600128 B1 | 7/2006 |
| WO | 81/02049 A1 | 7/1981 |

OTHER PUBLICATIONS

U.S. Appl. No. 12/950,807 by Norval P. Thomson, filed Nov. 19, 2010 entitled "Motor Grader Wheel Slip Control for Cut to Grade".

(Continued)

*Primary Examiner* — Russell Frejd
(74) *Attorney, Agent, or Firm* — Finnegan, Henderson, Farabow, Garrett & Dunner LLP

(57) ABSTRACT

A powertrain system for a mobile machine is disclosed. The powertrain system may have a power source, a plurality of traction devices, and a differential operatively connecting an output of the power source with the plurality of traction devices. The powertrain may also have a manual input device movable by an operator to generate a first signal indicative of a desire to lock the differential, at least one sensor configured to generate a second signal indicative of a parameter of the mobile machine, and a controller in communication with the at least one sensor, the manual input device, and the differential. The controller may be configured to inhibit locking of the differential based on the first signal when the second signal indicates the parameter deviating from an acceptable range.

20 Claims, 3 Drawing Sheets

(56) References Cited

U.S. PATENT DOCUMENTS

| | | | |
|---|---|---|---|
| 6,264,009 B1 | 7/2001 | Johnson | |
| 6,357,558 B1 | 3/2002 | Case et al. | |
| 6,361,466 B1 | 3/2002 | Kyrtsos | |
| 6,524,207 B2 | 2/2003 | Murakami et al. | |
| 6,597,979 B2 * | 7/2003 | Hagiwara et al. | 701/67 |
| 6,766,886 B2 | 7/2004 | Bendtsen et al. | |
| 6,820,712 B2 | 11/2004 | Nakamura | |
| 6,991,576 B2 | 1/2006 | Moore et al. | |
| 7,014,027 B2 | 3/2006 | Adair et al. | |
| 7,258,208 B1 | 8/2007 | Dennis et al. | |
| 7,291,094 B2 | 11/2007 | Heier et al. | |
| 7,506,730 B2 | 3/2009 | Strandberg et al. | |
| 7,650,961 B2 | 1/2010 | Smith et al. | |
| 7,693,639 B2 | 4/2010 | Suzuki et al. | |
| 7,766,104 B2 * | 8/2010 | Newberry et al. | 180/24.09 |
| 7,766,791 B2 * | 8/2010 | Bruce | 477/35 |
| 7,769,517 B2 * | 8/2010 | Segawa et al. | 701/68 |
| 7,770,681 B2 * | 8/2010 | Marathe et al. | 180/197 |
| 7,980,364 B2 | 7/2011 | Ueno | |
| 7,980,375 B2 | 7/2011 | Suzuki et al. | |
| 8,006,813 B2 | 8/2011 | James et al. | |
| 8,065,065 B2 * | 11/2011 | Satou et al. | 701/68 |
| 2009/0101458 A1 | 4/2009 | Strandberg et al. | |
| 2011/0269595 A1 * | 11/2011 | Marsh et al. | 475/220 |

OTHER PUBLICATIONS

U.S. Appl. No. 12/972,866 to Dennis Wetterich et al., filed Dec. 20, 2010 entitled "Traction Slip Indicator".

U.S. Patent Application by David C. Hoots et al. entitled "Wet Brake Assembly" filed on Jan. 23, 2012.

U.S. Patent Application by David C. Hoots et al. entitled "Brake Assembly Having Piloted Park Brake Housing" filed on Jan. 23, 2012.

U.S. Patent Application entitled "Multi-Brake System Having Independent Control" filed on Jan. 23, 2012.

U.S. Patent Application by Christopher A. Monroe entitled "Separator Plate for Brake Assembly" filed on Jan. 23, 2012.

* cited by examiner

POWERTRAIN SYSTEM HAVING LOCKABLE DIFFERENTIAL

TECHNICAL FIELD

The present disclosure relates to a powertrain system and, more particularly, to a powertrain system having a lockable differential.

BACKGROUND

Machines such as scrapers, wheel loaders, trucks, and other mobile equipment are used to perform many tasks. To effectively perform these tasks, the machines require an engine that provides significant torque through a transmission to multiple ground engaging traction devices. Such machines usually include one or more differentials that divide rotational power from the transmission between tandem pairs of traction devices. The differentials are used to simultaneously drive the traction devices while allowing them to rotate at different speeds, thereby reducing wear of the traction devices, the associated powertrain, and even the roadway during particular operations such as cornering. In some situations, however, a differential may also allow a machine to lose traction by transferring all or a majority of the power from the transmission to only the traction device that is slipping.

One way to reduce slipping of a traction device is to manually lock the differential when slipping is likely to occur or is already occurring. Locking the differential causes both of the paired traction devices to rotate at the same speed, even if one of the traction devices still does not have sufficient traction (i.e., even if the traction device is spinning faster than a travel speed of the machine). In this manner, the traction device that has adequate traction still receives enough power from the transmission to move the machine through terrain that is contributing to the slipping. Unfortunately, manual locking of a differential can lead to timing problems associated with locking and unlocking procedures. For example, it may be possible for a machine operator to attempt to lock the differential when high levels of slipping are already occurring (e.g., when one traction device is spinning much faster than the other paired traction device), which can lead to damage of the differential. Likewise it may be possible for the machine operator to retain the differential in a locked condition longer than necessary, which can lead to excessive wear of the machine.

One attempt to address one or more of the problems described above is disclosed in U.S. Pat. No. 6,174,255 that issued to Porter et al. on Jan. 16, 2001 ("the '255 patent"). In particular, the '255 patent discloses a work vehicle having a front axle with a differential and a lock that is hydraulically coupled to a solenoid valve. The solenoid valve is further coupled to a microprocessor, which has manual and automatic modes of operation. In the manual mode of operation, the solenoid valve is controlled to activate the lock and lock the differential when a foot pedal located in an operator's cab is depressed. In the automatic mode of operation, the microprocessor automatically determines when wheels of the front axle are slipping and responsively triggers the solenoid valve to activate the lock and stop the slipping. The microprocessor is further configured to determine when an articulation angle of the vehicle is greater than a programmed amount during operation in either the manual or automatic modes, and responsively trigger the solenoid valve to release the lock and reduce damage of the differential caused by cornering.

Although perhaps adequate for some situations, the system of the '255 patent may be less than optimal. In particular, the system does not inhibit an operator from locking the differential during conditions that could damage the differential. In addition, the system of the '255 patent may have limited applicability, as it fails to consider parameters specific to particular types of machines during automated unlocking of the differential.

The present disclosure is directed to overcoming one or more of the problems set forth above and/or other problems of the prior art.

SUMMARY

In one aspect, the present disclosure is directed to a powertrain system for a mobile machine. The powertrain system may include a power source, a plurality of traction devices, and a differential operatively connecting an output of the power source with the plurality of traction devices. The powertrain system may also include a manual input device movable by an operator to generate a first signal indicative of a desire to lock the differential, at least one sensor configured to generate a second signal indicative of a parameter of the mobile machine, and a controller in communication with the at least one sensor, the manual input device, and the differential. The controller may be configured to inhibit locking of the differential based on the first signal when the second signal indicates the parameter deviating from an acceptable range.

In another aspect, the present disclosure is directed to a method of operating a mobile machine. The method may include generating a power output, and directing the power output through a differential to a plurality of traction devices. The method may also include receiving a manual input indicative of a desire to lock the differential, detecting a parameter of the mobile machine, and selectively inhibiting locking of the differential based on the manual input when the parameter deviates from an acceptable range.

DETAILED DESCRIPTION

Figure 1:
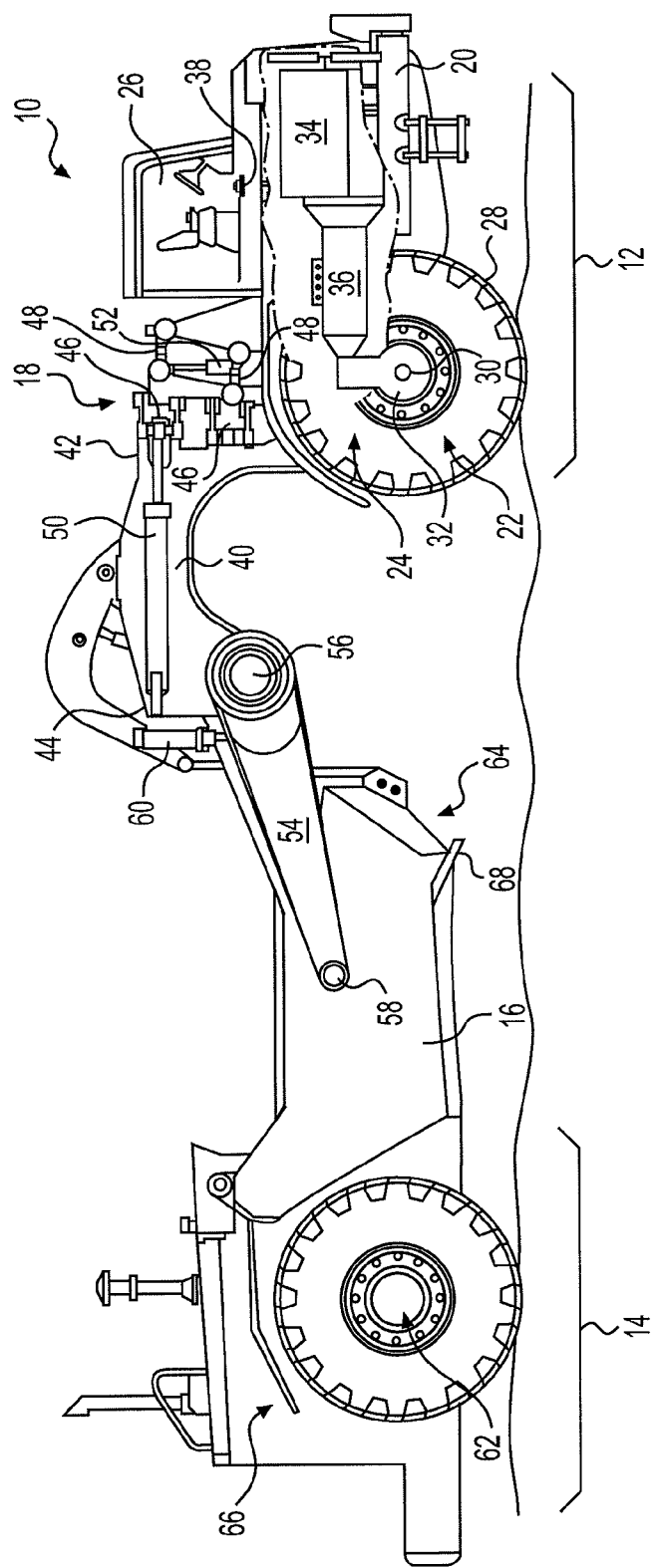
FIG. 1 is a pictorial illustration of an exemplary disclosed mobile machine.

FIG. 1 illustrates an exemplary mobile machine 10. Machine 10, in the disclosed example, is an earth-moving machine such as scraper that is configured to load material at a first location, transport the material from the first location to a second location, and unload the material at the second location. It is contemplated, however, that machine 10 may embody another type of mobile machine, if desired, such as an on- or off-highway haul truck, a wheel loader, or another machine known in the art. Machine 10 may include a front tractor 12 operatively connected to a rear tractor 14, and a bowl 16 disposed between front and rear tractors 12, 14. Front and rear tractors 12, 14 may cooperate to pull and push bowl 16 across a ground surface, respectively. Bowl 16 may be rigidly connected to rear tractor 14 and operatively connected to front tractor 12 via an articulated hitch assembly 18.

Front tractor 12 may include multiple components that interact to power and control operations of bowl 16. Specifically, front tractor 12 may include a frame 20, a front axle assembly 22, a powertrain 24, and an operator station 26.

Frame 20 may rotatably receive front axle assembly 22 and be configured to support powertrain 24. Powertrain 24 may be configured to drive front axle assembly 22 and provide electrical and/or hydraulic power to move bowl 16. Operator station 26, as will be described in more detail below, may facilitate manual control of machine 10.

Front axle assembly 22 may include, among other things, a plurality of traction devices 28, an axle 30 associated with each of traction devices 28, and a centrally-located differential 32 connected to interior ends of axles 30. In the disclosed exemplary embodiment, traction devices 28 are wheels mounted at exterior ends axles 30 opposite differential 32. It should be noted, however, that traction devices 28 other than wheels, for example tracks or belts, may utilized if desired. Differential 32 may be configured to receive a rotational input from powertrain 24 and provide a rotational output to each of axles 30 to drive traction devices 28 and thereby propel machine 10. When one of traction devices 28 rotates at a significantly different speed than another of traction devices 28 within the same axle assembly 22 during straight travel of machine 10, at least one of traction devices 28 is said to be slipping.

Differential 32 may include a combination of intermeshing gears and a lockable clutch (e.g., a conventional dog clutch) that interact to produce two different modes of operation during which axles 30 are either driven with a substantially equal torque or with a substantially equal speed. In particular, as is known in the art, when differential 32 is operating in an unlocked mode (i.e., when the dog clutch is unlocked), differential 32 may supply substantially equal amounts of torque to each of axles 30, regardless of speeds of axles 30 (i.e., the speeds of axles 30 may be different when differential 32 is operating in the unlocked mode). In contrast, as is also known in the art, when operating in a locked mode (i.e., when the dog clutch is unlocked), differential 32 may be configured to drive axles 30 at about the same speeds, regardless of an amount of torque supplied to each of axles 30 (i.e., the torque supplied to axles 30 may be different when differential 32 is operating in the locked mode). Operation with differential 32 in the locked mode may make steering difficult because of the equal speeds. Because differential 32 may include a dog clutch, when differential 32 is locked, axles 30 may be coupled to each other through mechanical interference (as opposed to friction common with other types of clutches) such that slipping of traction devices 28 is not possible without damage to differential 32. Differential 32 may be selectively caused to operate in the locked mode to maintain a tractive force of machine 10, or in the unlocked mode to reduce wear of traction devices 28 and/or powertrain 24 during particular operations such as cornering.

Powertrain 24 may be configured to generate a power output directed through differential 32 to axles 30. In the disclosed embodiment, powertrain 24 includes, among other things, an engine 34, and a transmission 36 operatively coupled between engine 34 and differential 32. Engine 34 may be any source of power known in the art, for example a combustion engine such as a diesel engine or a gasoline engine. Transmission 36 may be a power-shift transmission, a continuously variable transmission, or a hybrid transmission, as desired, and be configured to transmit a power output generated by engine 34 to differential 32 throughout a range of speed-to-torque ratios. It should be noted that powertrain 24 may include an alternative power source coupled to transmission 36, if desired, such as an electric motor, a fuel cell/motor combination, or another source known in the art.

Operator station 26 may include an interface device 38 located proximate an operator seat and configured to generate control signals associated with operation of machine 10. In one example, interface device 38 may be a foot switch located on a floor of operator station 26 and selectively manipulated (e.g., stepped on) by an operator to manually cause the dog clutch of differential 32 to lock and unlock. It is contemplated, however, that a different type of interface device, for example a pedal, a push button, or a lever may be utilized to control differential 32, if desired. The same or a different interface device may be used to control operations of bowl 16, if desired.

Articulated hitch assembly 18 (also known as a cushion hitch) may include a curved main beam 40 having a front end 42 and a back end 44. Front end 42 of beam 40 may be connected through a vertical hinge joint 46 and a horizontal hinge joint 48 to frame 20 such that beam 40 may pivot both in the horizontal direction and in the vertical direction relative to frame 20. A pair of steering actuators 50 (only one shown in FIG. 1) may be associated with vertical hinge joint 46 to provide for articulated steering of machine 10. Specifically, steering actuators 50 may embody left and right hydraulic cylinders located to either side of beam 40 that extend and retract in opposition to each other to thereby cause beam 40 to pivot in the horizontal direction at vertical hinge joint 46. A cushion actuator 52, for example a hydraulic cylinder, may be associated with horizontal hinge joint 48 to provide for selective isolation of operator station 26 from vertical movements of bowl 16. Cushion actuator 52 may be hydraulically locked during some modes of operations (e.g., during digging or unloading) such that beam 40 is inhibited from moving in the vertical direction relative to frame 20, and unlocked during other modes of operations (e.g., during transport) to allow beam 40 and bowl 16 to float in the vertical direction relative to frame 20.

Back end 44 of beam 40 may be connected to bowl 16 via a pair of arms 54 located on opposing sides of beam 40 (only one side shown in FIG. 1). Each arm 54 may include a first end 56 and a second end 58. First end 56 may be pivotally connected to back end 44 of beam 40, while second end 58 may be pivotally connected to bowl 16. A pair of bowl actuators 60 (only one shown in FIG. 1), for example hydraulic cylinders, may be connected between beam 40 at back end 44 and bowl 16, and configured to selectively raise bowl 16 away from the ground surface and lower bowl 16 toward the ground surface by retractions and extensions thereof, respectively.

Bowl 16 may be rigidly supported by rear tractor 14. During extension and retraction of bowl actuators 60, bowl 16 may be caused to pivot in the vertical direction about a rear axle assembly 62 such that a leading end 64 of bowl 16 may be raised and lowered relative to the ground surface. In some embodiments, an additional powertrain 66 may be contained within rear tractor 14 and supported by rear axle assembly 62. In these embodiments, powertrain 66 may be operated to drive rear axle assembly 62 and thereby push machine 10. Powertrain 66 of rear tractor 14 may be substantially identical to powertrain 24 of front tractor 12.

Bowl 16 may be a tool embodied as a generally hollow enclosure having an opening at leading end 64. A horizontal blade 68 may be located at leading end 64 and positioned to selectively engage the ground surface as leading end 64 is lowered by the extension of bowl actuators 60. In this configuration, an extension length of bowl actuators 60 may affect a depth of blade 68 into the ground surface and, in conjunction with a travel speed of machine 10, a rate of material removal from the ground surface.

Figure 2:
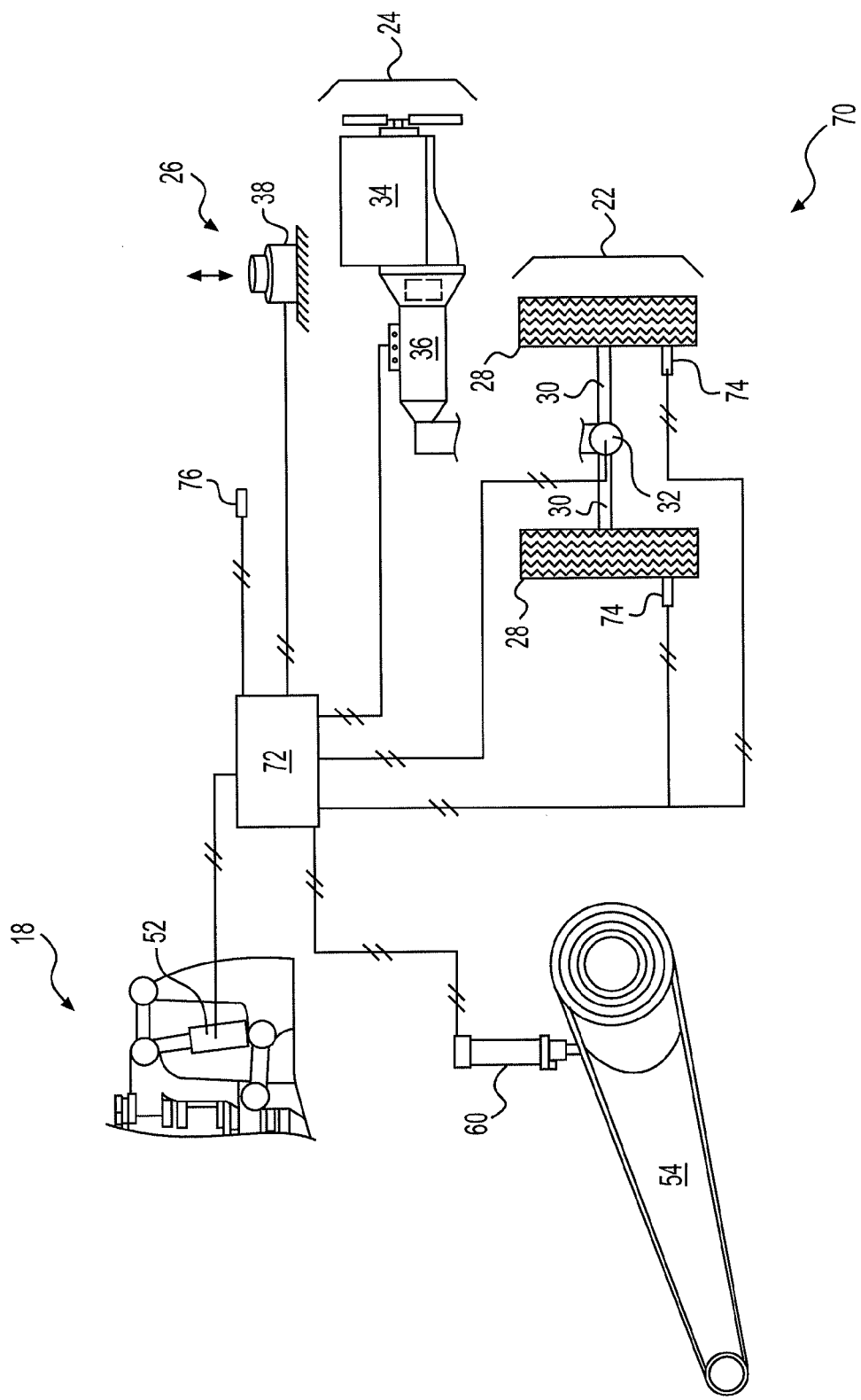
FIG. 2 is a diagrammatic illustration of an exemplary disclosed powertrain system that may be used with the mobile machine of FIG. 1.

As shown in FIG. 2, machine 10 may be equipped with a powertrain system 70 that includes components that cooperate to control differential 32 in response to various sensory and operator input. In particular, powertrain system 70 may include, among other things, a controller 72 in communication with differential 32, transmission 36, interface device 38, cushion actuator 52, bowl actuators 60, and/or one or more sensors located throughout machine 10 and configured to generate signals indicative of performance parameters of machine 10. Controller 72, as will be described in more detail below, may be configured to selectively cause the dog clutch of differential 32 to lock or unlock, thereby changing the mode of operation of differential 32 and the corresponding performance of traction devices 28.

Controller 72 may be configured to execute instructions stored on a computer readable medium to perform a method of differential control in response to received signals. Controller 72 may include any component or combination of components for monitoring, recording, storing, indexing, processing, and/or communicating operational aspects of machine 10 described above. These components may include, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from types of computer program products or computer-readable media, such as computer chips and secondary storage devices, including hard disks, floppy disks, optical media, CD-ROM, or other forms of RAM or ROM. Controller 72 may execute sequences of computer program instructions stored on the computer readable media to perform methods of differential control that will be explained below.

The sensors that could provide input to controller 72 may include, among others, a speed sensor 74 associated with each of axles 30 and/or traction devices 28, and a yaw rate sensor 76. Speed and yaw rate sensors 74, 76 may embody any conventional speed and yaw rate sensors known in the art. Based on input from multiple speed sensors 74, controller 72 may be configured to determine if slip (a difference in speed between traction devices 28) is occurring or is likely to occur. Based on input from yaw rate sensor 76, controller 72 may be configured to determine if and at what rate machine 10 is cornering (i.e., turning and/or articulating).

Controller 72 may be configured to determine additional information via communication with transmission 36, cushion actuator 52, and/or bowl actuators 60. For example, controller 72 may be configured to determine, through communication with transmission 36 or through communication with one or more sensors (not shown) associated with transmission 36, what the current speed-to-torque ratio (i.e., gear) is. Controller 72 may also be configured to determine, through communication with cushion actuator 52 or through communication with one or more sensors (not shown) associated with articulated hitch assembly 18, what the current status of articulated hitch assembly 18 is (i.e., if articulated hitch assembly 18 is in a locked or float condition). Similarly, controller 72 may be configured to determine, through communication with bowl actuators 60 or through communication with one or more sensors (not shown) associated with bowl 16, what the current position and/or loading condition of bowl 16 is.

Figure 3:
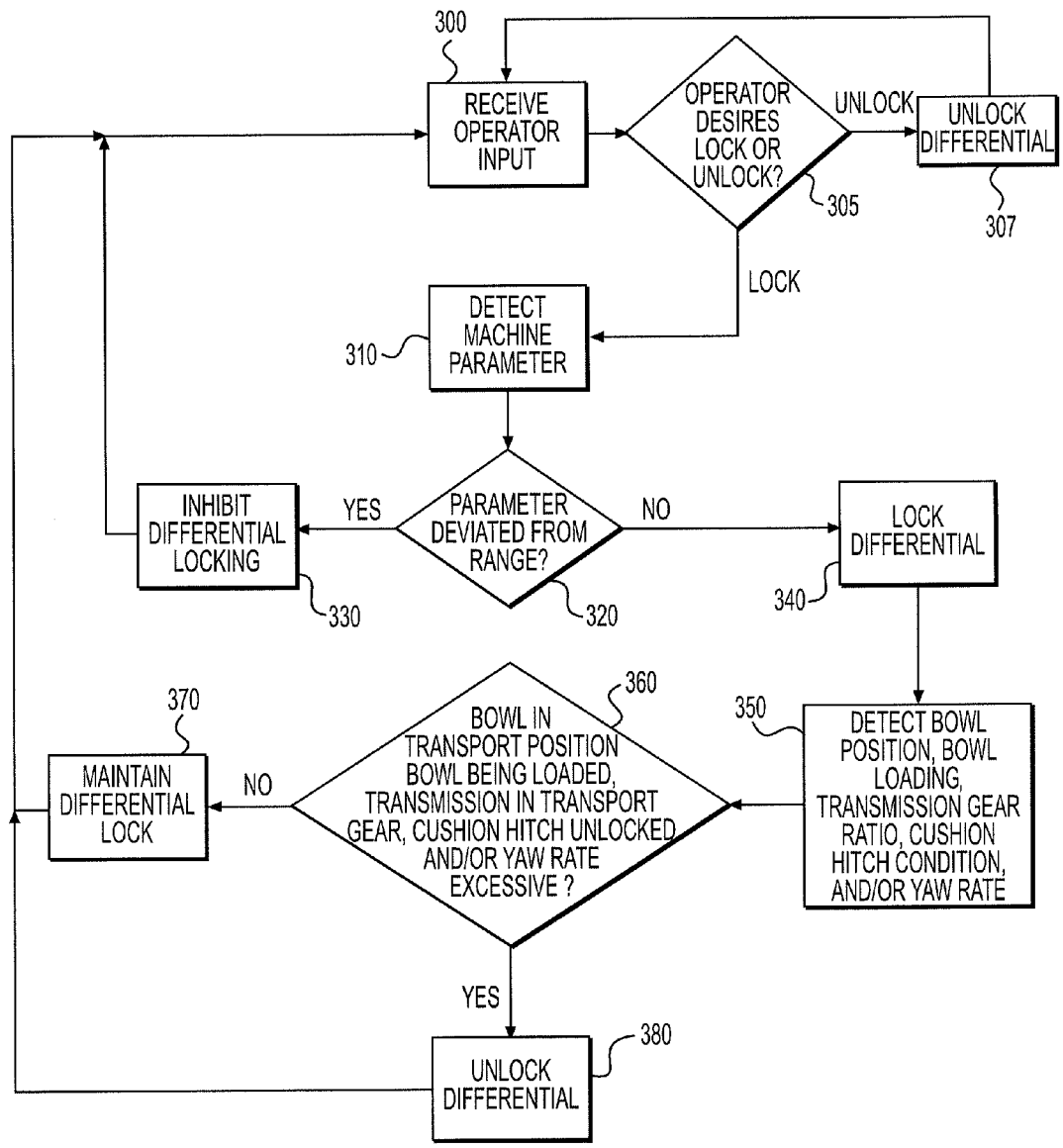
FIG. 3 is a flowchart depicting an exemplary disclosed method performed by the powertrain system of FIG. 2.

FIG. 3 illustrates an exemplary method stored as instructions on the computer readable medium that are executable by controller 72 to perform differential control of machine 10. FIG. 3 will be discussed in more detail in the following section to further illustrate the disclosed concepts.

INDUSTRIAL APPLICABILITY

The disclosed powertrain system may be applicable to any mobile machine where component protection of the machine's differential is desired. The disclosed powertrain system may help to protect the differential through regulation of both manual and automatic locking operations based on operator input and sensed performance parameters of the machine. Operation of powertrain system 70 will now be explained with respect to FIG. 3.

The exemplary method of controlling powertrain system 70 of machine 10 may begin with controller 72 receiving manual input from the operator of machine 10 regarding desired locking of differential 32 (Step 300). As described above, the input may include a signal generated by interface device 38 (referring to FIG. 2). For example, the operator may step on interface device 38 to indicate a desire to lock the dog clutch of differential 32 (when differential 32 is currently unlocked) and interface device 38 may generate a corresponding signal indicative of this desire. The operator may step on interface device 38 to indicate the desire to lock differential 32 when the operator becomes aware of slipping of traction devices 28 or, alternatively, when the operator initiates an operation where slipping is known to commonly occur. Slipping may commonly occur during loading or unloading of bowl 16, when a resistance to forward motion of machine 10 increases and/or when the underfooting of machine 10 becomes loose and provides less traction to traction devices 28. In like manner, the operator may step on interface device 38 again (or release interface device 38) to indicate a desire to unlock the dog clutch of differential 32 (when differential is currently locked) and interface device 38 may generate a corresponding signal indicative of this desire. The operator may step on interface device 38 to indicate the desire to unlock differential 32 when the operator completes the operation commonly associated with slipping and/or begins a transport operation where slipping is less likely to occur.

Based on the current status of differential 32 (i.e., whether differential 32 is currently locked or unlocked) and based on the signal from interface device 38, controller 72 may determine whether the operator desires to lock or unlock differential 32. For example, if differential 32 is locked when the signal from interface device 38 is received, controller 72 may determine that the operator desires to unlock differential 32 (Step 305: Unlock). Similarly, if differential 32 is unlocked when the signal from interface device 38 is received, controller 72 may determine that the operator desires to lock differential 32 (Step 305: Lock). When the operator desires to unlock differential 32, controller 72 may cause the dog clutch of differential 32 to disengage (Step 307), and control may return to step 300. However, when the operator desires to lock differential 32 control may continue to a step 310, where controller 72 detects various performance parameters of machine 10 that can affect successful engagement of the dog clutch.

Step 310 may be completed before, during, and/or after receiving input from the operator of machine 10 regarding the desire to lock differential 32, (Step 310). The performance parameters detected by controller 72 may include, among others, speeds of traction devices 28 received via sensors 74. Controller 72 may then compare the performance parameters to an acceptable range and determine if the performance parameters have deviated from the range (Step 320). For example, controller 72 may receive signals from sensors 74 associated with traction devices 28 and responsively determine if an actual slip value of traction devices 28 (i.e., an actual speed difference between opposing traction devices 28 or percentage difference from a machine ground speed) has deviated from an acceptable range of slip values. When the performance parameters deviate from the acceptable range, locking of differential 32 could cause damage to the dog clutch of differential 32 (e.g., the elevated difference in rotational speeds could cause the interfering components of the dog clutch to violently engage each other, resulting breakage of the components). Accordingly, in this situation, controller 72 many inhibit locking of differential 32 in response to the signal received from interface device 38 (Step 330). However, when the performance parameters fall within the acceptable range of values, controller 72 may instead lock differential 32 in response to the manual indication provided by the operator of machine 10 (i.e., in response to the signal from interface device 38) (Step 340).

During operation of differential 32 in the locked mode, axles 30 may be driven to rotate at about the same speeds and machine 10 may be provided with enhanced traction that provides for improved productivity and/or efficiency. Once machine 10 has passed through conditions that contribute to slip, the operator should manually unlock differential 32 by again manipulating interface device 38. In some situations, however, the operator may err and fail to unlock differential 32 when the enhanced traction is no longer necessary or beneficial. Accordingly, controller 72 may be configured to automatically override the operator and unlock differential 32 under certain conditions such that component life of traction devices 28 and/or powertrain 24 may be increased.

For example, after differential 32 has been locked according to operator desire (i.e., after completion of step 340), controller 72 may detect various other performance parameters of machine 10. In particular, controller 72 may detect a position of bowl 16, a loading condition of bowl 16, a speed-to-torque ratio (i.e., gear) of transmission 36, a condition of articulated hitch assembly 18 (locked or floating), a yaw rate (i.e., a cornering rate) of machine 10, and/or another parameter known in the art (Step 350). Controller 72 may then determine if the detected parameter(s) are indicative of conditions during which enhanced traction is no longer desired. That is, controller 72 may determine if bowl 16 is in a transport position (as opposed to a dig or dump position), if bowl 16 is not being loaded or unloaded, if transmission 36 is in a transport gear (a higher gear as opposed to a lower dig or dump gear), if articulated hitch assembly 18 is in float (as opposed to locked, which may be required during loading of bowl 16), and/or if machine 10 is cornering at a significant rate (as opposed to traveling in a straight line) (Step 360). If none of these conditions exist (Step 360: No), controller 72 may maintain the operator-desired locked condition of differential 32 (Step 370) and control may return to step 300. When, however, controller 72 determines that bowl 16 is in a transport position, not being loaded, or not being unloaded, that transmission 36 is in a high transport gear, that articulated hitch assembly 18 is unlocked, and/or that machine 10 is cornering at a significant rate, controller 72 may instead unlock differential 32 (Step 380) to help protect the components of differential 32, and control may return to step 300.

Because powertrain system 70 may allow for locking of differential 32 in response to manual input, the operator of machine 10 may be provided with greater control over machine operation. In addition, because powertrain system 70 may be functional to override operator commands for locking of differential 32 during conditions that could damage differential 32, the integrity of powertrain system 70 may be preserved. Further, because powertrain system 70 may be operable based on performance parameters particular to a certain application (e.g., particular to a scraper application), additional functionality of machine 10 may be provided. For example, powertrain system 70 may allow for automatic unlocking of differential 32 based on detection of specific scraper performance parameters, regardless of the operator's original command to lock differential 32 (i.e., regardless of the current position and/or condition of interface device 38). This functionality may help to enhance performance and/or longevity of machine 10 in the scraper application.

It will be apparent to those skilled in the art that various modifications and variations can be made to the disclosed powertrain system. Other embodiments will be apparent to those skilled in the art from consideration of the specification and practice of the disclosed powertrain system. It is intended that the specification and examples be considered as exemplary only, with a true scope being indicated by the following claims and their equivalents.

What is claimed is:

1. A powertrain system for a mobile machine, comprising:
a power source;
a plurality of traction devices;
a differential operatively connecting an output of the power source with the plurality of traction devices;
a manual input device movable by an operator to generate a first signal indicative of a desire to lock the differential;
at least one sensor configured to generate a second signal indicative of a parameter of the mobile machine, wherein the mobile machine is a scraper having a tractor connected to pull a bowl; and
a controller in communication with the at least one sensor, the manual input device, and the differential, the controller being configured to inhibit locking of the differential based on the first signal when the second signal indicates the parameter deviating from an acceptable range.

2. The powertrain system of claim 1, wherein:
the at least one sensor includes at least one speed sensor associated with at least one of the plurality of traction devices;
the parameter is a speed difference between the plurality of traction devices; and
the acceptable range is a range of acceptable speed differences.

3. The powertrain system of claim 2, wherein:
the at least one speed sensor includes a first speed sensor associated with a first of the plurality of traction devices, and a second speed sensor associated with a second of the plurality of traction devices; and
the controller is configured to determine a speed difference between the first and second of the plurality of traction devices based on signals from the first and second speed sensors.

4. The powertrain system of claim 1, wherein:
the at least one sensor is a yaw rate sensor; and
the acceptable range is a range of acceptable cornering rates of the mobile machine.

5. The powertrain system of claim 1, wherein:
the powertrain system further includes a position sensor associated with the bowl and configured to generate a third signal associated with a position of the bowl; and
the controller is further configured to unlock the differential based on the third signal, regardless of a position of the manual input device.

6. The powertrain system of claim 5, wherein the controller is configured to unlock the differential when the third signal indicates that the bowl is in a transport position.

7. The powertrain system of claim 1, wherein:
the powertrain system further includes a load sensor associated with the bowl and configured to generate a third signal associated with a loading condition of the bowl; and the controller is in further communication with the load sensor and configured to unlock the differential based on the third signal, regardless of a position of the manual input device.

8. The powertrain system of claim 7, wherein the controller is configured to unlock the differential when the third signal indicates the bowl is not being loaded or unloaded.

9. The powertrain system of claim 1, wherein:
the mobile machine is a scraper having a front tractor, a bowl, and a cushion hitch connecting the front tractor to the bowl; and
the controller is further configured to unlock the differential based on a condition of the cushion hitch, regardless of a position of the manual input device.

10. The powertrain system of claim 9, wherein the controller is configured to unlock the differential when the cushion hitch is unlocked.

11. The powertrain system of claim 1, wherein:
the power source includes an engine and a transmission connected between the engine and the differential; and
the controller is further configured to unlock the differential based on a gear ratio of the transmission, regardless of a position of the manual input device.

12. The powertrain system of claim 11, wherein the controller is configured to unlock the differential when the transmission is in a transport gear ratio.

13. A mobile machine, comprising:
a frame;
a plurality of traction devices configured to support the frame and propel the mobile machine;
an engine supported by the frame;
a transmission supported by the frame and coupled to the engine;
a differential disposed between the transmission and the plurality of traction devices;
wherein the mobile machine is a scraper having a tractor connected to pull a bowl;
a manual input device configured to generate a first signal indicative of a desire to lock the differential;
at least one speed sensor associated with the plurality of traction devices and configured to generate a second signal; and
a controller in communication with the manual input device, the at least one speed sensor, and the differential, the controller being configured to inhibit locking of the differential based on the first signal when the second signal indicates a speed difference between the plurality of traction devices deviating from an acceptable range.

14. A method of operating a mobile machine, comprising:
generating a power output;
directing the power output through a differential to a plurality of traction devices;
receiving a manual input indicative of a desire to lock the differential;
detecting a parameter of the mobile machine, wherein the mobile machine is a scraper having a tractor connected to pull a bowl; and
selectively inhibiting locking of the differential based on the manual input when the parameter deviates from an acceptable range.

15. The method of claim 14, wherein:
the parameter is a speed difference between the plurality of traction devices; and
the acceptable range is a range of acceptable speed differences.

16. The method of claim 14, wherein:
the parameter is a yaw rate of the mobile machine; and
the acceptable range is a range of acceptable cornering of the mobile machine.

17. The method of claim 14, wherein:
the method further includes:
sensing a position of the bowl; and
unlocking the differential when the bowl is in a transport position, regardless of the manual input.

18. The method of claim 14, wherein:
the method further includes:
sensing a loading condition of the bowl; and
unlocking the differential when the bowl is not being loaded or unloaded, regardless of the manual input.

19. The method of claim 14, wherein:
the mobile machine is a scraper having a front tractor, a bowl, and a cushion hitch connecting the front tractor to the bowl; and
the method further includes unlocking the differential when the cushion hitch is unlocked, regardless of the manual input.

20. The method of claim 14, wherein:
generating the power output includes generating power within an engine and transmitting power from the engine through a transmission to the differential; and
the method further includes unlocking the differential based on a gear ratio of the transmission, regardless of the manual input.

* * * * *